United States Patent [19]
> Ziccarelli

[11] 4,017,645
[45] Apr. 12, 1977

[54] FAST CONCHED CANDY COATING AND METHOD

[75] Inventor: Salvatore F. Ziccarelli, Downers Grove, Ill.

[73] Assignee: Beatrice Foods Co., Chicago, Ill.

[22] Filed: Aug. 23, 1976

[21] Appl. No.: 716,794

Related U.S. Application Data

[63] Continuation-in-part of Ser. No. 628,559, Nov. 3, 1975, Pat. No. 3,976,806.

[52] U.S. Cl. .............................. 426/613; 426/660; 426/519
[51] Int. Cl.² ...................... A23G 1/16; A23G 1/00
[58] Field of Search ................... 426/613, 660, 519
[56] References Cited

UNITED STATES PATENTS

| | | | |
|---|---|---|---|
| 1,387,377 | 8/1921 | Fryer et al. | 426/519 |
| 2,356,181 | 8/1944 | Rubens | 426/613 |
| 2,459,908 | 1/1949 | Alikonis | 426/660 |
| 2,673,802 | 3/1954 | Hansen | 426/519 |
| 3,579,355 | 5/1971 | Wyss et al. | 426/576 |

*Primary Examiner*—Jeanette M. Hunter
*Attorney, Agent, or Firm*—Murray and Whisenhunt

[57] ABSTRACT

A fast conched candy coating is prepared by providing a mixture of fat and sugar, optionally with milk solids, emulsifiers, flavoring, cocoa or cocoa butter, heating the mixture to a temperature above the melting point of the fat but below 150° F, and conching the mixture in a high speed shearing and mixing device. The mechanical energy imparted during the shearing and mixing raise the conching temperature to between 150° and 250° F in less than 30 seconds.

15 Claims, No Drawings

FAST CONCHED CANDY COATING AND METHOD

This application is a continuation-in-part of copending application Ser. No. 628,559, filed 11/3/75, now U.S. Pat. No. 3,976,806. The present invention relates to a method of fast conching a candy coating and to the coating which results therefrom. More particularly, the present invention relates to a method and coating which can be produced in a fraction of the time necessary for producing a conventionally conched compound coating for candies and the like.

BACKGROUND OF THE INVENTION

Many confectionaries are coated with a flavored candy coating. The coating helps to preserve the confectionary, imparts a desired eye-appeal and adds flavor. Bakery produced cakes, ice cream bars and popsicles, candy pieces and candy bars are conventionally coated with such flavored coatings. While these coatings can be flavored with any desired natural or artificial flavor, they are most often flavored with cocoa or chocolate liquor to form a chocolate flavored coating.

Chocolate coatings can be produced in the traditional way of making milk chocolate. This process, however, requires a rather expensive ingredient, i.e. cocoa butter. For this reason and for other reasons, milk chocolate candy coatings are relatively expensive and are not used on popularly priced confectionaries and in lieu thereof a compound coating is used. Compound coatings do not require a cooking step and are, generally speaking, simply a mechanical mixture of, principally cocoa, sugar and fat.

As can be appreciated, the solid ingredients and the fat of a compound coating must be so intimately mixed that the texture, mouth feel and taste of the compound coating will approximate that of milk chocolate. The process wherein these ingredients are mixed to that required extent is referred to in the art as the conching step. As is well-known in the art, conching must pulvarize the sugar, cocoa and other ingredients to the point that the compound coating has no "gritty" texture or mouth feel and to the extent that the cocoa is mechanically worked into the fat.

Traditionally, the conching step takes place on a "concher" which operates with rolling pressure to slowly grind and pulvarize the sugar, cocoa and other ingredients into the fat.

Also, during the conching step, the moisture content of the ingredients is reduced to very low levels, i.e., to 3 percent of less and more often to 0.5 percent or less. Water sensitive emulsifiers, such as lecithin, are added near the end of the conching step when the moisture content has been reduced to the range of these lower levels.

The time required to complete a conching step of the foregoing nature will depend upon the quality of the compound coating desired. For better compound coatings up to 80 to 85 hours on the concher are required and even for the very poor and generally unacceptable grades of compound coatings, at least 8 hours will be required. While this operation requires a minimum of supervision, it does require extended amounts of power and the long use of relatively expensive capital equipment. Accordingly, it would be most desired in the art to provide a method of conching which will considerably shorten the conching time, but which will provide the superior quality of long conching time compound coatings.

OBJECTS OF THE INVENTION

It is therefore an object of the invention to provide a method and compound coating wherein the conching step may be completed in a fraction of the time required for conventional conching and which conched compound coating will have properties at least equal to the long time conched compound coatings conventionally produced in the art. Other objects will be apparent from the following disclosure and claims.

BRIEF DESCRIPTION OF THE INVENTION

The present invention is based on three principal discoveries. Firstly, it has been discovered that by careful selection of the ingredients for compound coatings, it is possible to conch those ingredients at a fraction of the time required by conventional conching processes. Secondly, it has been discovered that those selected ingredients can be extremely quickly conched when the primary forces are shear forces, as opposed to compressive forces normally exerted by the rolling pressure of conventional conching machines. Thirdly, it was discovered that when using the careful selection of ingredients with the shear forces, relatively critical temperatures and times must be observed, or otherwise a satisfactory conching will not take place.

Thus, broadly stated, the present invention includes a process for producing a candy coating wherein a composition containing from 30 to 65 parts of fat and 40 to 70 parts of sugar, optionally with 0 to 8 parts milk solids or demineralized whey solids, 0 to 2 parts emulsifiers, 0 to 12 parts cocoa and 0-2 parts flavors, is heated to a temperature above the melting point of the fat but below 150° F, and then conched by a high speed shearing/mixing, where the composition is sheared by shearing forces having the major shear component at 75° or greater. The mixing during the shearing operation must supply sufficient mechanical energy into the mixture so as to raise the conching temperature of the heated mixture to at least 150° F, but no greater than 250° F. The time for raising the mixture to this conching temperature must be no greater than 30 seconds and during this shearing/mixing time, the moisture content of the conched mixture must be reduced to 5 percent or even 3 percent or even 2 or 1 percent or less. Thereafter, the conched mixture is quickly cooled to less than 180° F, if the conching temperature is greater.

The ingredients may be chosen so as to provide the essential taste of a conventional cocoa compound coating, i.e., fat, sugar, cocoa, milk or demineralized whey solids, emulsifiers, and flavors. A coating similar to a chocolate coating may be produced with hard butter and/or cocoa butter in lieu of part of the hard butter or, the coating may be similar to a conventionally artificially flavored compound coating, such as banana, cherry, etc., wherein larger amounts of fat and sugar are used, but additionally an artificial flavor is used in lieu of the cocoa.

DETAILED DESCRIPTION OF THE INVENTION

In copending application Ser. No. 628,559, filed on Nov. 3, 1975, the entire disclosure of which is incorporated herein by reference, a process is disclosed and claimed wherein a fast conched coating is prepared with the present coating composition by high speed shearing and mixing so that the fast conched mixture which results has sheared particles having at least one dimension of 40 microns or less in a conching time of less than 30 seconds and a conching temperature of 190° F to 220° F. A feature of that invention is the very rapid but also simultaneously reducing of the particle size of solids in the mixture and mixing, at the elevated temperatures accomplished by the mechanical energy input, until conching is accomplished and the flavor is developed.

That application discloses that the conching temperature must be raised extremely rapidly by mechanical energy sufficient to reach conching temperatures of 190° F to 250° F in less than 30 seconds, since longer time periods at these elevated temperatures increase the possibilities of overheating. For similar reasons, the conched mixture must be rapidly cooled to below 185° F after the conching operation.

It has now been further found that not only are the lower conching temperatures possible but are, indeed, preferable when microsugar is used. Indeed, in the present process little or no particle size reduction need be carried out at all during the conching step, so long as the various solid ingredients of the composition fed to the conching step, e.g. sugar, cocoa, milk solids, etc., have particle sizes below 60 to 65 microns but preferably below 40 microns. This allows lower conching temperatures with the same through-put times; thus, even further reducing the risk of overheating.

Further, if the conching temperature is kept below 185° F, e.g. 180° or 175° F, the cooling step can be eliminated altogether.

It should be understood, however, that the present process may be carried out at the higher conching temperature of the parent application (with a cooling step if 185° F of greater conching temperature is used) and the present process still has the added advantage that little or no particle size reduction of solids in the mixture to be conched is required.

The prepulvarized sugar may be added to the composition to be conched, or it may be pulvarized while in that mixture, prior to conching, or it may be contained in commercially available compound coatings or the like.

In the first case, the sugar may be pulvarized by a conventional pulvarizing hammer mill, ball mill or the like or it may be purchased commercially as pulvarized sugar.

In the second case, simple granulated sugar or partially pulvarized sugar may be added to the composition and the total composition, or a portion thereof containing the sugar, may be passed through a mill, e.g. a ball mill or hammer mill, to cause an in situ pulvarization of the sugar (as well as the other solid ingredients in that portion).

In the third case, compound coating and the like with pulvarized sugar therein may be commercially purchased and that compound coating can then be conched in the present manner to further develop the flavor by further conching.

In any event, the mixture being fed to the conching step should have particle sizes of the solid ingredients of 60 to 65 microns, preferably 40 microns, or less. Additionally the mixture being fed to the conching step should be a uniform mixture. To achieve this result, the fat must be heated to above its melting point so as to produce a liquid for uniformly mixing with the solid ingredients.

Method for obtaining particle sizes of the above ranges are well known in the art and will not be described herein in any detail. However, it is noted that some of the starting materials, e.g. cocoa, milk solids, may have particle sizes in the required range but that the particles may be agglomerated to larger lumps. The present mixing will properly deagglomerate the lumps.

The mixing may take place in any desired type of mixing device, but a scraped wall heated mixing device is a preferred form of the invention, since this continually removes the ingredients from the walls where heat transfer takes place and prevents local over heating of the ingredients during this initial mixing process. Many apparatus suitable for such operation are known in the art and include heated ribbon blenders, swept wall heat exchangers, sigma blade mixers and the like. A particularly convenient apparatus for this purpose is manufactured by the LITTLEFORD Company and model FKM and model KM are particularly suitable in this regard.

Irrespective of the kind of mixer used to mix the melted fat and dry ingredients, mixing must be continued until a flowable slurry, referred to hereafter as a "paste" is formed. In a high speed conching operation of the present nature, the incoming feed must be homogenous in nature, i.e., a portion of the initial feed must have essentially the same distribution of ingredients as a latter portion of the feed. Otherwise, the conching will not be uniform in such a short period of time. The paste need not be a permanent slurry or suspension, and it is only required that the paste uniformly distribute the dry ingredients for time sufficient to feed that paste to the conching mechanism. Generally speaking the paste should be stable for at least 3 to 4 minutes, but more usually, the paste will be stable for several hours or more (i.e., no substantial settling of the solids will take place within the foregoing time periods).

The heated paste mixture should be maintained at a temperature above the melting point of the fat. Otherwise, the paste will congeal or solidify. In the present process, the feed must be in fluid form, as opposed to the conventional concher where part of the feed could be in solid form. Under the circumstances, if the paste is allowed to solidify and then reheated, the chances of nonuniformity of solids distribution greatly increases.

On the other hand, if the temperature of this mixture exceeds about 150° F, the chances of undesired deterioration of the fat or cocoa or other flavors substantially increases. Additionally, the sugar may slowly change in undesired character. For improved safety in this regard, it is preferred that the temperature be maintained at less than 140° F, and more preferably less than 120° F.

The heated mixture is then passed to the conching operation. As noted above, the conching step must be carried out with prepulvarized sugar, i.e. having a particle size of 65, preferably 40 microns or less. It is further preferred, however, that the particle sizes be 35 microns or less and more preferably less than 30 microns.

A satisfactory range is an average particle size of between 15 and 25 microns, e.g. 20 microns. If solid ingredients, other than sugar, are added to the mixture, they must also be in these micron ranges, prior to feeding to the conching step. This size range may be provided in the same manners as discussed above in connection with the sugar.

The shearing and mixing during the conching step must rapidly heat the heated paste mixture to a temperature of 150° to 250° F. This temperature must be reached within 30 seconds, since a slow increase in temperature will require too long especially at the elevated temperatures, i.e., as the temperatures approach 190° F. Such extended dwell at temperatures approaching 190° F will cause undesired and unacceptable properties in the conched mixture. Therefore, the lower temperatures above 150° F are preferred.

In this latter regard, heating the mixture during the conching operation by heat transfer is too slow to accomplish the rapid temperature rise which is necessary. As the mixture conches, heat transfer is severely reduced between the heat transfer surface and the mixture, due to the pasting out and coating of heat transfer surfaces. To accomplish the rapid temperature increase it is necessary that the temperature rise be mechanically accomplished. In this regard, the term "mechanically" means that mechanical energy is converted to heat in the mixing by virtue of friction, shear and the like generated during the conching operation. This does not mean, however, that no heat may be added by heat transfer. It does mean, however, that the major amount of heat is generated by the mechanical energy input.

In order to accomplish a conching in such a short time, it is necessary that the conching forces be essentially shear forces, as opposed to compressive forces which are the majority forces in the standard concher of the prior art conching operation. These shear forces can be best generated by mills which use an anvil rotating in a slotted head where the anvil forces the material to be milled through the slotted head. This apparatus, however, is well known to the art and is commercially available. Accordingly, the details of the apparatus will not be presented in order to retain conciseness in this specification. Indeed, reference to this particular apparatus is by way of illustration to, primarily, explain the principle involved, rather than a criticality in the apparatus per se.

Basically, however, a series of blades are held in position in the slotted head by appropriate holding rings and the blades form an annular arrangement thereabout (See the parent application for a detailed description. The blades are spaced apart a small distance, i.e. between 0.005 and 0.3 inch, depending upon the particle sizes of the solids in the paste to be conched, the feed rates, the temperature of the paste, and the rate of feed. Generally, however, the blades are spaced apart about 0.15 inch. The blades are set near the radii generating from the axis. The blades are actually offset from the radius by an angle $\theta$ (the angle between the blades and the radii of the blades). This angle will induce at least some shear component which is less than 90°, for the reasons explained more fully hereinafter.

An impeller is carried within the circular space defined by the blades. The outermost ends of the impeller surface have a square shear surface. The impeller rotates on a shaft which is in mechanical communication with a power source.

The impeller fits within the array of blades such that the distance between the shear surface and the blades is very small (i.e., between 0.1 and 0.01 inch). As the impeller shaft rotates, the impeller, which is mechanically fixed thereto, also rotates. The heated paste is fed into the rotating impeller and is impelled outwardly toward the blades. As the paste contacts the blades, a shear force, in the direction of rotation, is created between the blades and the shear surface. Solid particles are therefore, sheared between the blades and the impeller in such a manner that the particles are cut or sliced rather than ground or crushed as was the prior art technique with conventional conchers.

It has been found, however, that if the average shear component is 90° ($\theta$ equal 0) then undesired heating may take place between the shear surface and the blades and in extreme cases can cause caramelizing of the sugar. Therefore, the average shear component is preferably less than 90°, although that shear component can very closely approach 90° with impunity. It appears that the undesired heating takes place only when the 90° shear component is very closely approached. Thus, the average shear component shoud be at least 75° in order to insure that proper shearing takes place, but preferably the average shear component will be between 85° and 89.9° and more preferably, between 87° and 89.5°. A preferred average shear component is 89° ($\theta = 1°$). Since the temperature must be raised extremely rapidly, the feed input to the conching device must be adjusted so that with mixing, shearing and extrusion of the conched mixture between the blades, sufficient mechanical energy is generated to raise the conching temperature to 150° to 250° F in less than 30 seconds. It is preferred, however, that these temperatures be between 150° and 220° F and optimum temperatures are between 150° and 175° F Additionally, since the longer periods of dwell at high temperatures give rise to greater possibilities of undesired overheating, it is preferred that the conching temperature be maintained for less than 15 seconds, and more preferably less than 10 seconds. Accordingly, by adjusting the feed to have this short dwell time in the conching device and by allowing the conched mixture to contact ambient temperatures after exit from the conching device, the short dwell time will not require a positive cooling step. In any event, the conched mixture should not remain above about 150° in order to prevent undesired affects and more preferably below less than 120° F. To avoid any overheating, this cooling should take place in less than 60 minutes and move preferably less than 30 minutes and more preferably in less than 5 minutes.

During the conching operation, the moisture content, by virtue of the high temperatures, will be reduced to 5 percent of less. More preferably, however, the moisture content will be 2.0 percent or less and moisture contents as low as 1.0 to 2.0 percent are preferred.

With the foregoing process, various compositions may be conched. Thus, 30 to 25 parts of fat, 45 to 55 parts of sugar, 4 to 12 parts of cocoa, and 3 to 8 parts of milk solids or demineralized whey solids produce compound coating. Preferably, that coating will also include 0.1 to 0.8 parts of emulsifier, such as lecithin, and from 0.1 to 2 parts of flavors, such as salt, vanilla, etc.

Alternately, 30 to 35 parts of cocoa butter, 45 to 55 parts of sugar, 4 to 12 parts of cocoa 1 to 5 parts of milk solids and preferably up to 4 parts of chocolate liquor will produce a coating which is very similar to milk chocolate. Here again, it is preferred that the composition includes 0.1 to 0.8 parts of emulsifier, such as lecithin, and from 0.1 to 2 parts of flavoring, again such as salt and vanilla.

Alternately, fruit flavors and other flavor coatings may be produced. In this connection 30 to 65 parts of fat, 40 to 60 parts of sugar and 0.1 to 2 parts of artificial flavor will be used, and again 0.1 to 0.8 parts of emulsifier and 3 to 2 to 8 parts of milk or whey solids may be used. The invention will be illustrated by the following examples, although the invention is not limited thereto and is fully applicable to the foregoing disclosure. In the specification, the following examples and claims, all percentages and parts are by weight, unless otherwise indicated.

EXAMPLE 1

Thirty-three parts of hard butter, having a melting point of 98–101° F, was heated in a steam jacketed mixing tank to 106° F. The melted fat and the following solid ingredients were placed in a LITTLEFORD FKM-6000 mixer: 8.19 parts of cocoa; 51 parts of microsugar (average particle size of 20 microns); 5 parts of non-fat milk solids; 0.4 parts of lecithin; and 0.41 parts of flavors (vanilla and salt). The fat and solids were mixed until a smooth paste was obtained. The mixing deagglomerated the cocoa, milk solids and lecithin to particles of less than 40 microns.

The "paste" mixture was conched by feeding the mixture to an URSCHEL COMITROL 1250 high speed shearing and mixing machine. The blades were set at 1° (89° shearing). The feed of the mixture and the rotation of the impeller were adjusted until the mixture remained in the machine for about 6 seconds to develop the flavor. The conching temperature of the mixture entering the machine was about 110° F; the mixture exiting from the machine was about 170° F and the moisture content of the conched mixture was about 3%.

The conched mixture cooled immediately on exiting the machine by ambient air to about 150° F in about 30 minutes.

The mixture was pumped to a holding tank and used to coat caramels, i.e., MILK DUDS and a taffy/nut CLARK candy bar. The resulting coating was at least equal in taste, mouth-feel and shelf properties to conventional compound coating.

EXAMPLE 2

Example 1 was repeated except that 60 parts of microsugar was used and the cocoa was replaced by 0.4 parts of artificial banana flavor. 0.05 parts of USDA yellow No. 5 was also used.

The resulting product was the same as Example 1 except that it had a banana flavor rather than a chocolate flavor.

EXAMPLE 3

A commercially available compound coating containing about 40 parts of fat, 50 parts of microsugar, 3.5 parts of milk solids, 0.1 parts of lecithin, 6 parts cocoa and salt is passed through the apparatus of Example 1 under the same conditions. The chocolate flavor is greatly enhanced.

What is claimed is:

1. A process for producing a candy coating comprising:
   1. providing a mixture in a paste form having the following ingredients:
      a. 30 to 65 parts fat,
      b. 40 to 70 parts sugar,
      c. 0 to 8 parts milk and/or whey solids,
      d. 0 to 2 parts emulsifier,
      e. 0 to 12 parts cocoa, and
      f. 0 to 2 parts flavors; and
   2. conching the paste mixture by high speed shearing and mixing, wherein the mixture is subjected to shearing forces having an average shear component of 75° or greater to produce an essentially mechanically generated conching temperature in the mixture of about 150° to 250° F in a conching time of less than 20 seconds and to reduce the moisture content of the conched mixture to 5 % or less.

2. The process of claim 1 wherein the ingredients are: 30 to 35 parts fat; 45 to 55 parts sugar; 4 to 12 parts cocoa; and 3 to 8 parts milk and/or whey solids.

3. The process of claim 2 wherein the ingredients also include: 0.1 to 0.8 parts emulsifier and 0.1 to 2 parts flavors.

4. The process of claim 1 wherein the ingredients are: 30 to 35 parts hard butter; 45 to 55 parts sugar; and 1 to 4 parts cocoa butter.

5. The process of claim 4 wherein the ingredients also include 0.1 to 0.8 parts emulsifier and 0.1 to 2 parts flavor.

6. The process of claim 1 wherein the ingredients are: 30 to 65 parts fat; 40 to 60 parts sugar; and 0.1 to 2 parts flavors.

7. the process of claim 6 wherein the ingredients also include 0.1 to 0.8 parts emulsifier and 3 to 8 parts milk and/or whey solids.

8. The process of claim 1 wherein the conching temperature is below 175° F.

9. The process of claim 1 where the average shear component is at 85° or greater.

10. The process of claim 9 where the average shear component is at 87° or greater.

11. The process of claim 1 wherein the conching temperature is between 150° and 175° F.

12. The process of claim 11 wherein the conching temperature is between 150° and 170° F.

13. The process of claim 1 wherein the conching time is less than 15 seconds.

14. The process of claim 12 wherein the conching time is less than 10 seconds.

15. The product produced by the process of claim 1.

* * * * *

UNITED STATES PATENT OFFICE
CERTIFICATE OF CORRECTION

Patent No. 4,017,645          Dated April 12, 1977

Inventor(s) Salvatore F. Ziccarelli

It is certified that error appears in the above-identified patent and that said Letters Patent are hereby corrected as shown below:

The term of this patent subsequent to August 24, 1993 has been disclsimed.

*Signed and Sealed this*

Twenty-fourth *Day of* May 1977

[SEAL]

*Attest:*

RUTH C. MASON
*Attesting Officer*

C. MARSHALL DANN
*Commissioner of Patents and Trademarks*